(12) United States Patent
Tong et al.

(10) Patent No.: US 9,083,499 B1
(45) Date of Patent: Jul. 14, 2015

(54) DECISION FEEDBACK SOLUTION FOR CHANNELS WITH LOW SIGNAL TO NOISE RATIO

(71) Applicant: CAMBRIDGE SILICON RADIO LIMITED, Cambridge (GB)

(72) Inventors: Fei Tong, Bassingbourn (GB); Hong Wan, Santa Clara, CA (US); Erik Lindskog, Cupertino, CA (US)

(73) Assignee: CAMBRIDGE SILICON RADIO LIMITED, Cambridge (GB)

( * ) Notice: Subject to any disclaimer, the term of this patent is extended or adjusted under 35 U.S.C. 154(b) by 0 days.

(21) Appl. No.: 14/145,813

(22) Filed: Dec. 31, 2013

(51) Int. Cl.
*H04K 1/10* (2006.01)
*H04L 27/28* (2006.01)
*H04L 1/00* (2006.01)
*H04B 7/04* (2006.01)
*H04L 27/26* (2006.01)

(52) U.S. Cl.
CPC ............ *H04L 1/0054* (2013.01); *H04B 7/0413* (2013.01); *H04L 1/0048* (2013.01); *H04L 27/265* (2013.01)

(58) Field of Classification Search
CPC ... H04L 1/0054; H04L 1/0048; H04L 27/265; H04B 7/0413
USPC .......... 375/260, 267, 299, 347, 346, 349; 455/500, 501, 101; 370/329, 330, 436
See application file for complete search history.

(56) References Cited

U.S. PATENT DOCUMENTS

| | | | |
|---|---|---|---|
| 7,746,951 B2 * | 6/2010 | Hwang et al. | 375/267 |
| 2007/0086541 A1 | 4/2007 | Moon et al. | |
| 2007/0211815 A1 | 9/2007 | Pan et al. | |
| 2010/0215085 A1 * | 8/2010 | Lee et al. | 375/219 |
| 2013/0007554 A1 | 1/2013 | Chen et al. | |

* cited by examiner

*Primary Examiner* — Phuong Phu
(74) *Attorney, Agent, or Firm* — Pillsbury Winthrop Shaw Pittman LLP

(57) ABSTRACT

This invention is related to a low-complexity MIMO detector in a wireless communication system with near optimal performance. Initial symbol estimation is performed for a transmitted symbol vector. The soft information of the transmitted symbol vector can be more accurately calculated by deemphasizing the LLRs associated with symbols belonging to weak channels that may suffer from poor initial estimation. By combining aspects of both the linear detection and the ML detection, the complexity of the proposed detector becomes orders of magnitude lower than that of a ML detector, but the performance is very close to that of an ML detector.

12 Claims, 6 Drawing Sheets

DECISION FEEDBACK SOLUTION FOR CHANNELS WITH LOW SIGNAL TO NOISE RATIO

FIELD OF THE INVENTION

The invention is related to wireless communication systems, and more particularly, to methods and apparatus of implementing low-complexity MIMO detectors in a wireless communication system with near maximum likelihood performance even under poor channel conditions.

BACKGROUND OF THE INVENTION

Having evolved rapidly and steeply in the past two decades, the wireless communication systems now offer a wide variety of services such as multimedia communications, web browsing, audio and video streaming, online game playing, etc. Not surprisingly, the number of users accessing these services has also increased drastically. The resulting increase in data traffic together with the scarceness of wireless spectrum resources has made high efficiency data transmission an essential factor in the design of wireless communication systems.

The use of multiple-input-multiple-output (MIMO) techniques has thus become the new frontier of wireless communications. The MIMO technique basically employs multiple antennas at both transmitter and receiver to allow the transmission of parallel data streams over available spatial channels, which in turn makes high-rate data transfers and improved link quality possible.

The optimal MIMO detector for a wireless communication system is a maximum-likelihood (ML) detector, which seeks to minimize the average probability of error between the detected symbols and the transmitted symbols. However, designing an ML detector is equivalent to solving a non-deterministic polynomial-time (NP)-hard problem, thus impractical to implement due to its exponential complexity.

In practice, people have proposed different linear implementations to approximate ML detectors so that the computational complexity is manageable. Examples of these approximation implementations include the minimum mean square error (MMSE) detectors and the zero forcing (ZF) detectors, which have conventionally been used for their low complexity. However, the performance of these conventional linear detectors drops significantly in poor channel conditions. Thus, there remains a considerable need for methods and apparatus in low-complexity MIMO detector designs that have high performance even in poor channel conditions.

SUMMARY OF THE INVENTION

The invention relates to methods and apparatus for a low-complexity MIMO detector design in a wireless communication system with near optimal performance, even when the channel conditions are poor. To reduce the complexity, a new MIMO detector design according to embodiments finds an approximation to the ML problem based on the results of initial linear symbol detection. Thus by combining aspects of both the linear detection and the ML detection, the complexity of the detector becomes orders of magnitude lower than that of a ML detector, yet the performance is very close to that of an ML detector. As will become apparent to those ordinarily skilled in the art upon review of the description below, the various aspects of the invention disclosed in this application allow for flexibility and low complexity in design as well as cost reduction in hardware.

According to an aspect of the invention, data transmitted in a broadband communication system with multiple transmit antennas and receive antennas is detected by first receiving, at a receiver of the communication system, a received symbol vector corresponding to a transmitted symbol vector. The condition of the communication channel is estimated. Soft information of the transmitted symbol vector is calculated based on the received symbol vector. The computed soft information of the transmitted symbol vector is then scaled by a scaling factor according to the communication channel condition. The transmitted data is then decoded and retrieved by a channel decoder based on the corresponding scaled soft information.

According to another aspect of the invention, a MIMO detection apparatus for a wireless communication receiver is disclosed. The MIMO detection apparatus comprises an input port coupled to the multiple receive antennas of the receiver to receive a received symbol vector corresponding to a transmitted symbol vector. The MIMO detection apparatus further comprises a processor that performs communication channel estimation, computes soft information of the transmitted symbol vector based on the received symbol vector, and scales the computed soft information of the transmitted symbol vector according to the estimated communication channel condition.

These and other aspects of the invention, including systems and computer program products corresponding to the above methods and apparatus, will be apparent to a person skilled in the art in view of the following drawings and detailed description.

BRIEF DESCRIPTION OF THE DRAWING

Aspects and features of the invention will become more apparent to those ordinarily skilled in the art upon review of the following description of specific embodiments of the invention in conjunction with the accompanying figures, wherein.

DETAILED DESCRIPTION OF THE SPECIFIC EMBODIMENTS

The invention will now be described in detail with reference to the drawings, which are provided as illustrative examples of the invention so as to enable those skilled in the art to practice the invention. Notably, the figures and examples below are not meant to limit the scope of the invention to a single embodiment, but other embodiments are possible by way of interchange of some or all of the described or illustrated elements. Moreover, where certain elements of the invention can be partially or fully implemented using known components, only those portions of such known components that are necessary for an understanding of the invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein.

In the present specification, an embodiment showing a singular component should not be considered limiting, rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the invention encompasses present and future known equivalents to the known components referred to herein by way of illustration.

Figure 1:
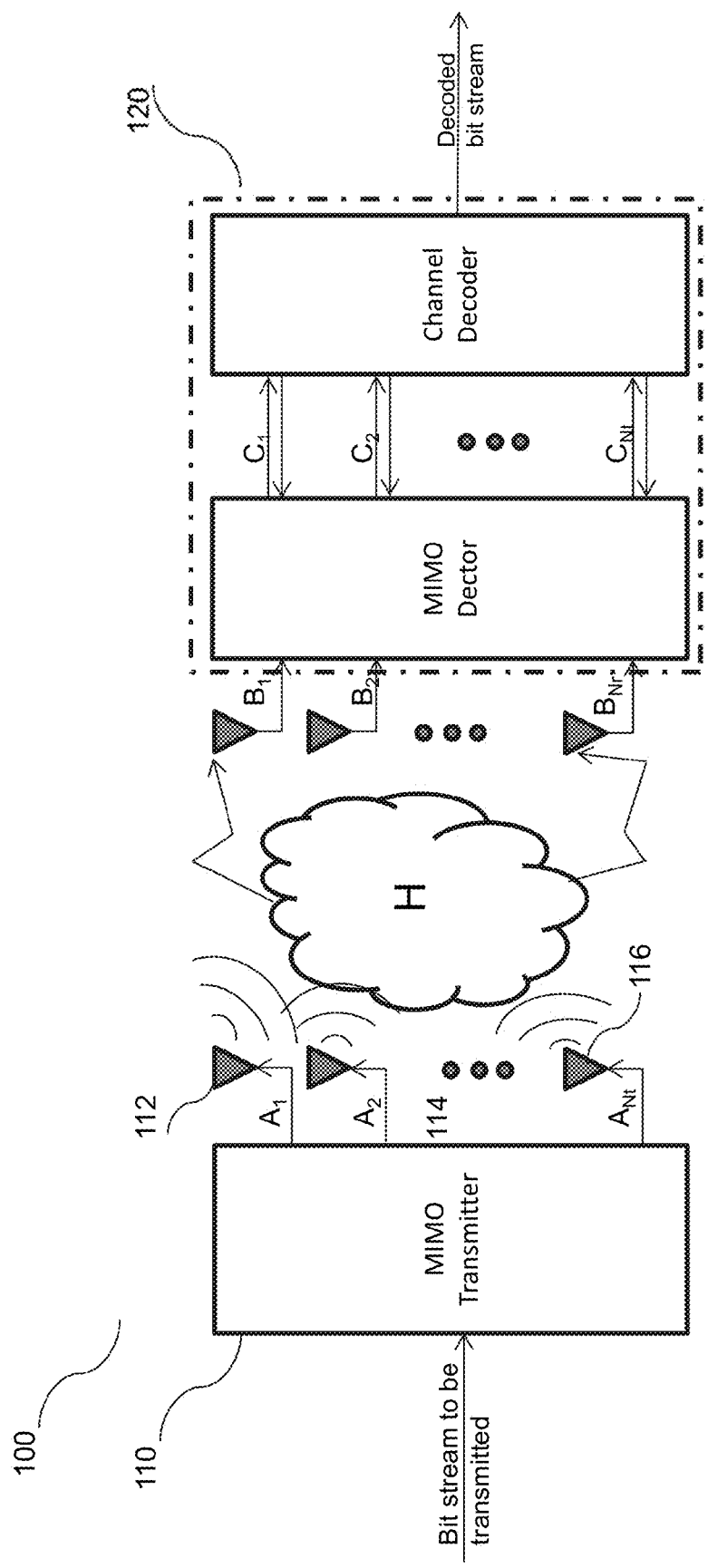
FIG. 1 is a conceptual block diagram of a wireless communication system to provide a context to an embodiment of the invention.

FIG. 1 is a block diagram of an exemplary wireless communication system with multiple transmit antennas and multiple receive antennas (MIMO system) to provide a context to an embodiment of the invention. MIMO system 100 employs $N_t$ transmit antennas and $N_r$ receive antennas for data transmission. MIMO system 100 consists of a MIMO transmitter 110 and a MIMO receiver 120. Transmitter 110 and receiver 120 are capable of implementing various aspects and embodiments of the invention, as described below.

Transmitter/Receiver 110/120 can be implemented in an IEEE 802.11 chipset. As such, the invention can be incorporated into any devices that now or in the future include 802.11 functionality such as modems, desktop, notebook, tablet, computers, smart phones, etc. In addition, the disclosed invention can also, for example, be applied to chipsets for other cellular standards like LTE and WiMax (802.16) as well as in any other communication system where MIMO transmission is used. Wired communications using MIMO may also implement the invention disclosed herein. Those skilled in the art will understand how to implement the invention by adapting firmware or software of such chipsets under the functionality of the invention after being taught by the present disclosure.

In some embodiments, at transmitter 110, data to be transmitted is processed by a data processor (not shown) that encodes and interleaves the data based on one or more coding schemes to provide encoded data. The coding schemes are for different purposes such error detection and error correction, etc. Although most of communication systems adopt certain coding schemes for error correction, these channel coding schemes are not the claimed invention thus not further described hereafter. The encoded data is then modulated to become data symbols by one or more modulators, which may also receive pilot data that may be multiplexed with the encoded data. Typically, the pilot data is data of a known pattern and processed in a known manner thus may be used by receiver 120 to perform a number of functions such as acquisition, frequency and timing synchronization, channel estimation, coherent data demodulation and so on. There are many different modulation schemes that can be used (e.g., M-QAM, M-PSK, and so on).

It is also contemplated that the invention is applicable where the modulation may be performed based on a single modulation scheme for all transmit antennas, one modulation scheme for each transmit antenna or each subset of transmit antennas, or one modulation scheme for each transmission channel or each group of transmission channels.

Often, orthogonal frequency division multiplexing (OFDM) (not shown) is used to mitigate inter-symbol interference between the multiple data symbols transmitted. The modulated data symbols are further OFDM modulated using an IFFT with the insertion of a cyclic prefix before they are transmitted via transmit antennas $A_1$ through $A_{Nt}$ over communication channel 130. This OFDM is however not necessary for the claimed invention to work.

At receiver 120 according to some aspects of the invention, the signals transmitted over communication channel 130 are received by receive antennas $B_1$ through $B_{Nr}$. The received signals are OFDM demodulated by discarding the cyclic prefix and applying an FFT on the received samples on a per-carrier basis from all receive antennas. MIMO detector 122 processes these OFDM demodulated signals and generates the soft information of the transmitted data bits. Channel decoder 124 takes in the soft information and then decodes the data bits transmitted.

Although in FIG. 1 multiple connection lines ($C_1, C_2, \ldots C_{Nt}$) are depicted between MIMO detector 122 and Channel decoder 124 with each line transferring the LLRs of one data symbol, persons skilled in the art will understand that it is also possible to implement the disclosed invention by connecting MIMO detector 122 and Channel decoder 124 via one line as the decoding can be performed based on one sequence of LLRs.

In the present disclosure, the term "MIMO detector" is used as a non-limiting illustrative example of a multiple-in-multiple-out detector module that takes as input the received digital symbols from the multiple receive antennas, computes the soft information of transmitted data bits, and outputs the computed soft information to a channel decoder. The MIMO detector according to some aspects of the invention may be a standalone chip with its own storage in a receiver, or may be a module coupled to other functional modules (e.g., channel estimator, channel decoder) in a single receiver chip and share the storage with other functional modules. The MIMO detector according to some aspect of the invention may be completely implemented in hardware, or have part or all of its functionality performed in software.

As an example of the above wireless system, assuming without loss of generality the number of transmit antennas $N_t=2$ and the number of receive antennas $N_r=2$, the received signal Y can be modeled as:

$$Y = HX + N \Leftrightarrow \begin{bmatrix} y_1 \\ y_2 \end{bmatrix} = \begin{bmatrix} h_{11} & h_{12} \\ h_{21} & h_{22} \end{bmatrix} \begin{bmatrix} x_1 \\ x_2 \end{bmatrix} + \begin{bmatrix} n_1 \\ n_2 \end{bmatrix} \quad (1)$$

Where the complex-valued channel gains $h_{11}, h_{12}, h_{21}, h_{22}$ of channel matrix H is known to receiver 120. As discussed above, pilot data is used to estimate channel gains. This and other techniques to estimate channel gains are well known in the art and not described in this disclosure for reason of brevity. Similarly, the noise variance can be estimated using pilot data. The known white channel additive noise $n_1$ and $n_2$ are complex Gaussian distributed with variance $\sigma_2$.

It is further assumed without loss of generality that both transmit symbols $x_1$ and $x_2$ are from the same M-QAM constellation. Thus each symbol represents M transmit data bits. Accordingly, there are a total of $2^M$ symbols in the constellation and a total of $2^{2M}$ possible symbol vectors. Using A to denote the symbol set and $A^2$ to denote the symbol vector set, the transmit symbol vectors can be mathematically expressed as: $X \in A^2 \Leftrightarrow \{x_1 \in A, x_2 \in A\}$.

The transmit bits are denoted by $b_i$, while $b_1, \ldots, b_M$ are mapped to the first symbol $x_1$ and $b_{M+1}, \ldots, b_{2M}$ are mapped to the second symbol $x_2$. The objective of a MIMO detector is to detect how likely the transmitted bits are 0s or 1s. As discussed above, one category of practical methods are linear detectors, such as the MMSE detectors or the ZF detectors. Such detectors have low complexity but the performance can be very poor in fading channels.

On the other hand, as also discussed above, a maximum likelihood (ML) detector is one of the non-linear detectors that have superior performance at the cost of very high complexity. As is well known, the maximum likelihood (ML) detector computes the soft information of transmit bits in the form of log-likelihood ratio (LLR):

$$LLR(b_i) = \min_{\{X^c \mid_{X^c \in A^2}^{b_i=0}\}} \frac{\|Y - HX^c\|^2}{\sigma^2} - \min_{\{X^c \mid_{X^c \in A^2}^{b_i=1}\}} \frac{\|Y - HX^c\|^2}{\sigma^2} \quad (2)$$

Here, $X^c = [x_1^c, x_2^c]^T$ denotes a candidate transmit vector, $\{X^c | b_i = 0, X^c \in A^2\}$ the set of candidate vectors with the i-th bit being 0, and $\{X^c | b_i = 1, X^c \in A^2\}$ the set with the i-th bit being 1. It is obvious that the size of each set is $2^{2M-1}$, which grows exponentially with respect to M.

To reduce the complexity, it is contemplated to find an approximation to Equation (2) based on the results of initial MMSE symbol detection. By combining the linear detection and the ML detector in some sense, a balance between performance and complexity can be achieved. As described below, the embodiments of the invention has a complexity that is orders of magnitude lower than that of an optimal ML detector but the performance is very close to the performance of a ML detector. The architecture and calculations of the proposed detector is optimized in a way to allow flexibility and low complexity in the hardware implementation.

According to one aspect of the invention, using the same 2×2 MIMO wireless system described before as an embodiment of a low-complexity near ML detector, the first step is to perform initial symbol detection of $x_1$ or $x_2$ based on a received symbol vector $Y = \{y_1, y_2\}$ using a linear MMSE detector.

$$X^{mmse} = (H^*H + \sigma^2 I_{2 \times 2})^{-1} H^* Y \Leftrightarrow \begin{bmatrix} x_1^{mmse} \\ x_2^{mmse} \end{bmatrix} = \quad (3)$$

$$\left( \begin{bmatrix} h_{11}^* & h_{21}^* \\ h_{12}^* & h_{22}^* \end{bmatrix} \begin{bmatrix} h_{11} & h_{12} \\ h_{21} & h_{22} \end{bmatrix} + \begin{bmatrix} \sigma^2 & 0 \\ 0 & \sigma^2 \end{bmatrix} \right)^{-1} \begin{bmatrix} h_{11}^* & h_{21}^* \\ h_{12}^* & h_{22}^* \end{bmatrix} \begin{bmatrix} y_1 \\ y_2 \end{bmatrix}$$

Where the initially detected symbols $x_1^{mmse}$ and $x_2^{mmse}$ can be detected according to equation (3) above. Then a candidate symbol set can be constructed to only include those candidate symbols (constellation points) which are 'close' enough to the initially detected symbols $x_1^{mmse}$ and $x_2^{mmse}$. For a 2×2 MIMO detector, there are a total of two sets, which can, for example, be defined as below:

$$V(x_1^{mmse}) \equiv \{x_1^c \mid \|x_1^c - x_1^{mmse}\|^2 < \epsilon_1\} \quad (4)$$

$$V(x_2^{mmse}) \equiv \{x_2^c \mid \|x_2^c - x_2^{mmse}\|^2 < \epsilon_2\} \quad (5)$$

To simplify the calculation of the two candidate symbol sets, the initial MMSE estimates $x_1^{mmse}$ and $x_2^{mmse}$ are hard sliced to the transmitted QAM constellation sets. In addition, the candidate symbol sets can be pre-computed and stored in look up tables. So, instead of calculating a candidate symbol set in real time, a candidate symbol set can be looked up given an initial MMSE symbol estimate (e.g., $x_1^{mmse}$ or $x_2^{mmse}$).

The thresholds $\epsilon_1$ and $\epsilon_2$ can be properly adjusted to make each candidate symbol set contain K candidate symbols. This ensures the detector has a fixed complexity—a very desirable property to ensure completion of the detection in a fixed period of time using a fixed amount of resources.

While each candidate symbol set defines the candidates of one symbol in the transmitted symbol vector, the other symbols in the transmitted symbol vector are detected under the hypothesis that this symbol is the correct one. This can be done by using to a zero-forcing decision feedback equalizer (ZF-DFE) to estimate $x_2$ given $x_1$ as:

$$x_1^c \in V(x_1^{mmse}) \Rightarrow x_2^{zfdfe} = \left\lceil \frac{[h_{12}^* \ h_{22}^*] \begin{bmatrix} y_1 - h_{11} x_1^c \\ y_2 - h_{21} x_1^c \end{bmatrix}}{\|h_{12}\|^2 + \|h_{22}\|^2} \right\rceil \quad (6)$$

$$x_2^c \in V(x_2^{mmse}) \Rightarrow x_1^{zfdfe} = \left\lceil \frac{[h_{11}^* \ h_{21}^*] \begin{bmatrix} y_1 - h_{12} x_2^c \\ y_2 - h_{22} x_2^c \end{bmatrix}}{\|h_{11}\|^2 + \|h_{21}\|^2} \right\rceil \quad (7)$$

Where $\lceil \cdot \rceil$ denotes the slicing operation that makes hard detection decisions.

The overall or combined candidate set can be expressed as the union of these two sets:

$$\Omega \Leftrightarrow \{X^c = [x_1^c x_2^{zfdfe}]^T | x_1^c \in V(x_1^{mmse})\} \cup \{X^c = [x_1^{zfdfe} x_2^c]^T | x_2^c \in V(x_2^{mmse})\} \quad (8)$$

and the LLRs can be computed as:

$$LLR(b_i) = \min_{\{X^c \mid_{X^c \in \Omega}^{b_i=0}\}} \|Y - HX^c\|^2 - \min_{\{X^c \mid_{X^c \in \Omega}^{b_i=1}\}} \|Y - HX^c\|^2 \quad (9)$$

Note that $\sigma^2$ is removed in equation (9) as a common scaling factor that without any effect on the performance.

According to one aspect of the invention, an additional step of LLR scaling can be optionally applied after Equation (9). It has been observed that at low SNR, the detector described above suffers from error propagation. If the effective channel gain is weak, the initial symbol detection becomes unreliable and subsequently the LLR values end up erroneous. To overcome this issue, an additional LLR scaling can be applied to the left hand side of (9), such that the LLRs for the instances with weak channels are scaled down properly. The effective channel gains are approximated as $$\begin{bmatrix} \frac{1}{g_1 \sigma^2} & \frac{1}{g_2 \sigma^2} \end{bmatrix}^T$$

with $$\begin{bmatrix} g_1 \\ g_2 \end{bmatrix} = \text{diag}((H^* H + \sigma^2 I_{2 \times 2})^{-1}).$$

Here diag (•) denotes the diagonal elements of the matrix.
Given a threshold δ, when $$\frac{1}{g_1 \sigma^2} \leq \delta,$$

i.e, when the SNR of the communication channel corresponding to the first symbol is below the predetermined threshold δ, the bit LLR values in the first symbol can be scaled as follows:

$$\text{LLR}(b_i) = \mu \times \text{LLR}(b_i) \text{ For } i=0,\ldots,M-1 \quad (10)$$

Similarly, if $$\frac{1}{g_2 \sigma^2} \leq \delta,$$

the LLR values of all bits in the second symbol can be scaled as follows:

$$\text{LLR}(b_i) = \mu \times \text{LLR}(b_i) \text{ For } i=M,\ldots,2M-1 \quad (11)$$

It should be apparent to persons skilled in the art that using a joint set of candidate symbol vectors to calculate the LLR soft information is not necessary to apply the scaling described above. Rather, the scaling can also be applied to conventional calculation of LLR values using separate candidate set.

It is noted that there can be many variants on the scaling discussed above, as long as the scaling factor μ is inversely reflective of the SNR of the communication channel, i.e., the higher SNR, the smaller μ, or vice versa. Further, a person of skill in the art may select various LLRs to apply the scaling to.

To avoid redundant calculations, the following intermediate variables (A, B, C, D and E) can be computed only once in a pre-processing step:

$$\begin{cases} A = \|h_{11}\|^2 + \|h_{21}\|^2 \\ B = h_{11} h_{12}^* + h_{21} h_{22}^* \\ C = \|h_{12}\|^2 + \|h_{22}\|^2 \\ D = h_{11}^* y_1 + h_{21}^* y_2 \\ E = h_{12}^* y_1 + h_{22}^* y_2 \end{cases} \quad (12)$$

Consequently, Equations (3), (6), (7), and the effective channel gains can be rewritten as follows:

$$\begin{bmatrix} x_1^{mmse} \\ x_2^{mmse} \end{bmatrix} = \frac{\begin{bmatrix} C + \sigma^2 & -B^* \\ -B & A + \sigma^2 \end{bmatrix} \begin{bmatrix} D \\ E \end{bmatrix}}{(A + \sigma^2)(C + \sigma^2) - \|B\|^2} \quad (13)$$

$$x_2^{zfdfe} = \left[ \frac{E - B x_1^c}{C} \right] \quad (14)$$

$$x_1^{zfdfe} = \left[ \frac{D - B^* x_2^c}{A} \right] \quad (15)$$

$$\begin{bmatrix} g_1 \\ g_2 \end{bmatrix} = \frac{\begin{bmatrix} C + \sigma^2 \\ A + \sigma^2 \end{bmatrix}}{(A + \sigma^2)(C + \sigma^2) - \|B\|^2} \quad (16)$$

Figure 2:
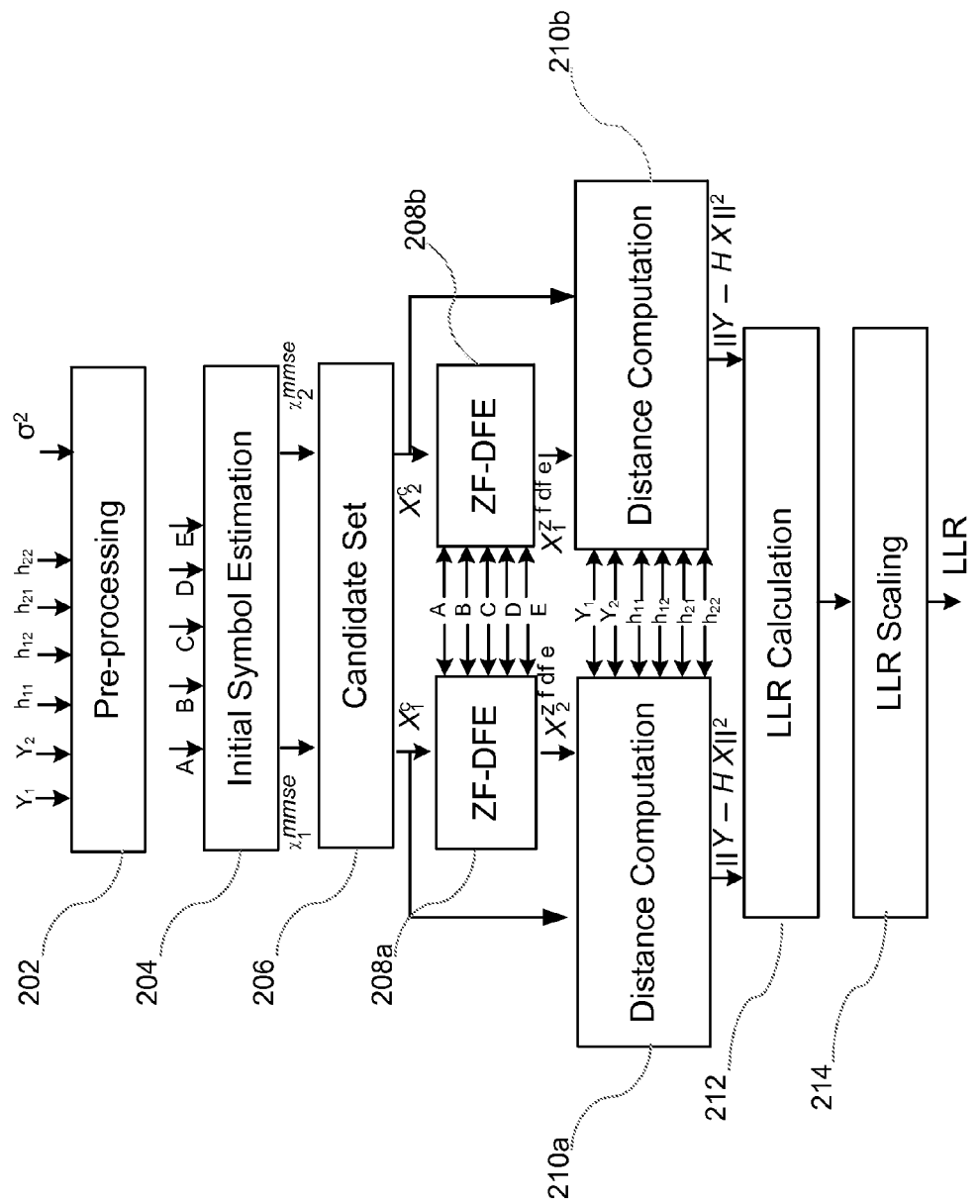
FIG. 2 is a block diagram showing a hardware implementation of a 2×2 MIMO detector according to one aspect of the invention.

FIG. 2 is a block diagram showing a hardware implementation of a 2×2 MIMO detector according to one aspect of the invention. MIMO detector 200 consists of an optional pre-processing module 202, initial symbol estimation module 204, candidate symbol set generation module 206, ZF-DFE hard detection modules 208a and 208b, Distance Computation modules 210a and 210b, LLR Calculation module 212 and optionally LLR Scaling module 214.

Optionally, pre-processing module 202 takes as input channel gains $h_{11}$, $h_{12}$, $h_{21}$, $h_{22}$ of channel matrix H and the variance $\sigma^2$ of the channel noise determined by other modules (not shown) of receiver 120. Pre-processing module 202 calculates the values of intermediate variables A, B, C, D and E according to equations (12) and then stores the values for use by initial symbol estimation module 204 and ZR-DFE hard detection modules 208a and 208b in the subsequent process.

According to some aspect of the invention, initial symbol estimation module 204 makes a preliminary detection of the transmitted symbol vector, i.e., $[x_1^{mmse}, x_2^{mmse}]$ by using a MMSE detector that implements equation (3) described before. In some embodiments, initial symbol estimation module 204 can be more efficiently implemented according to equation (13) as discussed above using the values of A, B, C, D and E that are pre-calculated by module 202.

It is also contemplated that initial symbol estimation module 204 may use any other conventional linear symbol detector that is well known in the art, such as a Zero Forcing detector, MMSE, MMSE-SIC and V-BLAST detectors.

According to some aspect of the invention, candidate symbol set module 206 generates a set of candidate symbols for each initially estimated symbol in the transmitted symbol vector, which is calculated by initial symbol estimation module 204.

Specifically, equations (4) and (5) are used to construct a candidate symbol set for each of the estimated symbols $x_1^{mmse}$ and $x_2^{mmse}$ to only include those constellation points which are 'close" enough to the initially estimated symbols $x_1^{mmse}$ and $x_2^{mmse}$ respectively. In some embodiments, the closeness is measured in terms of Euclidean distance. In some other embodiments, the closeness may be defined in other metrics different from Euclidean distance. For example, the sum of per coordinate absolute value difference (also called a Norm-1 measure) may be used instead. Also, per hard sliced QAM point customized sets can be constructed. This is likely advantageous when dealing with QAM points that are near the edge of the constellation or at its corners, which will become more apparent in the discussion below.

As described before, to ensure the MIMO detectors have fixed complexity, the size of the candidate symbol set can be a pre-determined number K (e.g., K=4, 5, . . . , 25). However, the candidate set size can also be adjusted to tradeoff between performance and cost (the cost of power consumption and/or memory space.)

Once K is fixed, candidate symbol set module 206 adjusts the threshold values $\epsilon_1$ and $\epsilon_2$ of equations (4) and (5) respectively to make sure that each candidate symbol set contain K candidate symbols.

In some embodiments, to simplify the calculation of the candidate sets thus reduce power consumption during run time, candidate symbol set module 206 does not calculate the candidate set on the fly. Instead, a possible candidate symbol set of a given set size for each symbol in the constellation can be pre-calculated once. All possible candidate symbol sets for various set sizes are stored in a look-up table that can be looked up by the corresponding symbol and set size. At run time, candidate symbol set module 206 simply uses the candidate symbol set size and a specific initially estimated symbol (e.g., $x_1^{mmse}$ or $x_2^{mmse}$) to look up the corresponding set of candidate symbols. (e.g., $X_1^C, X_2^C$). For example, if K=4, then $X_1^C$ consists of four candidate symbols that are closest to $x_1^{mmse}$, $X_2^C$ consists of four candidate symbols that are closest to $x_2^{mmse}$.

It will be appreciated that different methods or criteria can be applied to find possible candidates regardless of their complexity because the look-up table can be generated offline.

It is also contemplated that instead of using such candidate sets, the symbol candidates can be generated on the fly with some simple rules. For example, if the set of candidates is defined to be within a squared area around the initially estimated symbols, the hardware logic to find these candidates should be fairly simple.

According to some aspect of the invention, ZF-DFE detection modules are used to generate an overall (or combined) set of candidate symbol vectors for a transmitted symbol vector of size N. The overall (or combined) set is a union of candidate symbol vector sets, where each candidate symbol vector set is of size K and corresponds to one of the N initially estimated symbols of the transmitted symbol vector.

In some embodiments, each receive antenna has a corresponding dedicated ZF-DFE hard detection module. Thus the number of ZF-DFE hard detection modules (e.g., 208a, 208b, etc) equals N, i.e., the total number of symbols in a transmitted symbol vector.

Each ZF-DFE module (208a or 208b) takes as an input a candidate symbol set generated by module 206 and generates a candidate symbol vector set as an output. Each candidate symbol set corresponds to one of the N initially estimated symbols determined by module 204. For a given candidate symbol in a given candidate symbol set, the ZF-DFE detection module assumes that the given candidate symbol is the correct symbol that has been transmitted. The ZF-DFE module then uses a zero-forcing decision feedback equalizer to detect the rest of the N−1 symbols in the transmitted symbol vector. A candidate symbol vector is then formed with the given candidate symbol and the N−1 ZF-DFE detected symbols. The ZF-DFE module does this for each of the K candidate symbol in a given candidate symbol set, thus generates a candidate symbol vector set that consists of K candidate symbol vectors.

The overall (combined) set of candidate symbol vectors is formed by taking the union of the N candidate symbol vector sets determined by the N ZF-DFE detection modules. It is noted that in reality, the size of the overall (combined) set is typically much smaller than the sum of the size of the N candidate symbol vector sets since there is likely overlapping of candidate symbol vectors among the candidate symbol vector sets. This reduction in size is advantageous as it significantly reduces the complexity for the computing of the soft information of transmitted bits using the LLR method discussed above.

Unlike the existing methods, where the candidate sets for the N spatial streams are generated separately and each candidate set is only used for calculating the bit LLR values of one spatial stream, it is contemplated to use every candidate distance to update all bit LLR values of all the spatial streams, regardless to which candidate set the candidate symbol vector comes from. This results in much better performance, especially when K is small, without any added calculation.

Returning to the 2×2 MIMO detector as depicted in FIG. 2, assuming K=4, ZF-DFE hard detection module 208a implements equation (6) to find an estimated symbol $x_2$ for each of the four candidate symbols in the candidate symbol set $X_1^C$ corresponding to the initially estimated symbol $x_1^{mmse}$. The resulting four candidate symbol vectors thus can be denoted as:

$$X_2^{zfdfe} = \{\{X_1^{C1}, X_2^{Zfdfe1}\}, \{X_1^{C2}, X_2^{Zfdfe2}\}, \{X_1^{C3}, X_2^{Zfdfe3}\}, \{X_1^{C4}, X_2^{Zfdfe4}\}\}$$

Similarly, ZF-DFE hard detection module 208b implements Equation (7) to estimate $x_1$ for each of the four candidate symbols in the candidate symbol set $X_2^C$ corresponding to the initially estimated symbol $x_2^{mmse}$.

As described before, the 2×2 MIMO detector may use a pre-processing module that pre-calculates the variables A, B, C, D and E according to one aspect of the invention. Therefore, the hardware design of ZF-DFE detection modules 208a and 208(b) can also be simplified by implementing equations (14) and (15) respectively with the values of A, B, C, D and E retrieved from pre-processing module 202.

Distance calculation modules (e.g., 210a and 210b) calculate for every candidate symbol vector in the overall (combined) set the distance between the received symbol vector.

It is noted that although FIG. 2 depicts two distance calculation modules, persons skilled in the art will recognize that a single distance calculation module can be used to perform the calculation for both data streams.

In some embodiments, LLR calculation module 212 then calculates all bit LLR values according to equation (9). The result is then passed to a channel decoder (e.g., channel decoder 124 as in FIG. 1) in the MIMO detector to decode the transmit data bits.

Additionally, according to another aspect of the invention, LLR scaling module 214 scales the calculated LLR values calculated by LLR calculation module 212 before they are sent to a channel decoder. As discussed above, this is based on the observation that the MIMO detector 120 suffers from error propagation when the signal to noise ratio of the communication channel is low. At low SNR (i.e., weak channel gain), the initial symbol estimation by module 204 is less reliable. To account for this, it is contemplated that LLR scaling module 214 scales the results of LLR calculation module 212 according to equations (10) and (11) for the two different signal paths respectively. Effectively, when the SNR is low, the scaling factor is larger. Accordingly, the LLR bit values corresponding to the more likely erroneous initial symbol estimation are scaled down to mitigate the error propagation.

It will be appreciated that LLR scaling for weak channels mainly helps to improve the performance only when the number of candidates is much smaller than the full candidate set size. For small constellations, the LLR scaling thus can be disabled to save power.

In some embodiments, the same scaling factor is used for all the data streams. In other embodiments, different scaling factors may be used for different data streams.

As discussed above, it will be apparent to persons skilled in the art that using a joint set of candidate symbol vectors to calculate the LLR soft information is not necessary for applying the scaling described above. Rather, the scaling can also be applied to conventional LLR calculation where each LLR value uses its own corresponding separate candidate symbol set.

Figure 3:
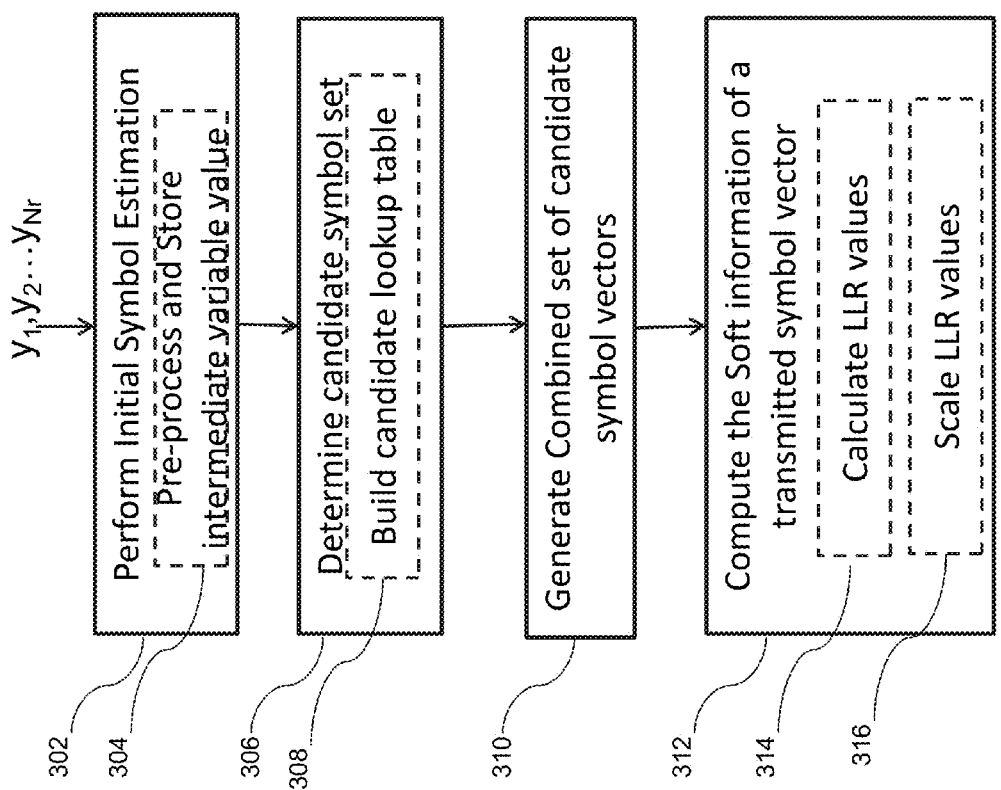
FIG. 3 is a flow chart of a 2×2 MIMO detector according to one aspect of the invention.

A flow chart for an example embodiment of determining soft information of transmitted data in a broadband communication system with multiple transmit antennas and (N) receive antennas is shown in FIG. 3. The first step is performing initial symbol estimation for each symbol of the symbol vector (302), where the symbol vector consists of the OFDM demodulated symbols corresponding to the multiple symbols received from the multiple antennas. As discussed above, any conventional linear symbol detection methods can be used in this step, such as MSEE and ZF detectors.

Optionally, a pre-processing step (304) can be performed to calculate and store a set of variable values that only need to be calculated once for a given set of channel gains and the received symbol vector. As discussed above, the same set of variables will also be used in some subsequent steps. Thus by pre-calculating and storing these values, the power consumption during run time and calculation delay can be reduced. For a 2×2 MIMO detector, the variable values that need only calculated once are described by equation set (12).

After the initial symbol estimation (302), a candidate symbol set is determined for each initially estimated symbol of the transmitted symbol vector (306). For a symbol vector having N symbols, N candidate symbol sets are generated in step 306. Each candidate symbol set consists of K candidate symbols (or constellation points) that are closest to the corresponding initially estimated symbol.

K is a parameter that can be pre-determined during the channel estimation time to account for the channel condition. In general, the larger the value of K is, the more accurate the symbol detection is, but also more calculation will be necessary. Geometrically, there are 4 nearest neighbors to each constellation point (except the ones on the boundary). So, the reasonable range of K is 4-25. The typical choice of K includes 5, 9, and 25.

Once K is chosen, for a given modulation scheme, all possible candidate symbol sets can be calculated offline and stored in a look up table (308) by calculating for each constellation point in the constellation the closest K points. Generating a candidate symbol set for a particular initially estimated symbol becomes a simple table look up using the initial estimated symbol and K as indices since each initially estimated symbol is also a constellation point.

Once they are determined, the N candidate symbol sets can be applied to generate (310) a combined set of candidate symbol vectors.

Certain embodiments use a ZF-DFE method to obtain a candidate symbol vector set as an output for a given candidate symbol set. Specifically, for a given candidate symbol in a given candidate symbol set, the ZF-DFE detection method assumes that the given candidate symbol is the correct symbol that has been transmitted, then uses a zero-forcing decision feedback equalizer to detect the rest of the N−1 symbols in the transmitted symbol vector. For example, in the case of N=2, equations (6) and (7) are solved respectively to estimate symbol $x_2$ given $x_1$ and estimate $x_1$ given $x_2$. A candidate symbol vector is then formed by combining the given candidate symbol and the N−1 corresponding ZF-DFE detected symbols. The ZF-DFE detection is performed for each of the K candidate symbol in a given candidate symbol set, and accordingly generates a candidate symbol vector set that consists of K candidate symbol vectors.

The overall (combined) set of candidate symbol vectors is formed by taking the union of the N candidate symbol vector sets determined by the N ZF-DFE detection. It will be appreciated that the number of candidate symbol vectors in the overall set is typically less than the sum of all the symbol vectors in the N candidate symbol vector sets (N×K) as it is likely that there are many overlapped candidate symbol vectors among these candidate symbol vector sets.

The soft information of a transmitted symbol vector is then calculated (312). In some embodiments, the soft information is calculated according to an LLR equation (314) (e.g. equation (9)), which computes the distance between the transmitted symbol vector and every candidate symbol vector in the combined set.

The computed soft information of the transmitted symbol vector is then output to a channel decoder for decoding the transmit data bits.

The various aspects of the invention discussed above allow a MIMO detector to be implemented to meet the real time constraints with a minimal cost in hardware and have improved performance and/or reduced complexity as compared to existing approaches.

According to one aspect of the invention, complexity reduction is achieved through the use of the table-based candidate set generation. Otherwise, to directly compute the candidates per spatial stream, it requires $3 \times 2^M$ real additions/subtractions and $2 \times 2^M$ real multiplications in order to compute the distances to all the constellation symbols, plus the additional logic to sort and find the K smallest distances. Table 1 shows the number of arithmetic operations required per QAM symbol for the candidate set calculation if a look-up table is not used. This is the amount of calculations that can be saved by using the lookup table-based candidate set generation, according to one aspect of the invention. Of course, there are also other methods that can save calculations. For instance, by taking the lattice structure into account, one natural approach is to start the search from the nearest neighbors, so that the process can be terminated early once the K nearest candidates are found. However, the required extra logic for boundary checks and sorting operations can still be costly.

TABLE 1

Required computations for generation of candidate set for one QAM-symbol if not using a look-up table.

| Operations | 64QAM | 256QAM |
| --- | --- | --- |
| Adds/Subs | 192 | 768 |
| Muls | 128 | 512 |

To show the efficacy of one example embodiment of the MIMO detection according to one aspect of the invention, a floating point simulation is set up for 2×2, 20 MHz transmission under the 802.11n type-B Non-LOS channel model. In the simulation, the Protocol Data Unit (PDU) packet size is 256 bytes, modulation scheme is 256QAM, Binary Convolutional Coding scheme with a coding rate of ¾. In addition, ideal channel estimation is assumed. The result is averaged over 10,000 packet transmissions. Simulation results are presented below in FIGS. 4-6.

In each of the figures, the x-axis is the SNR and the y-axis is the Packet Error Ratio (PER).

Figure 4:
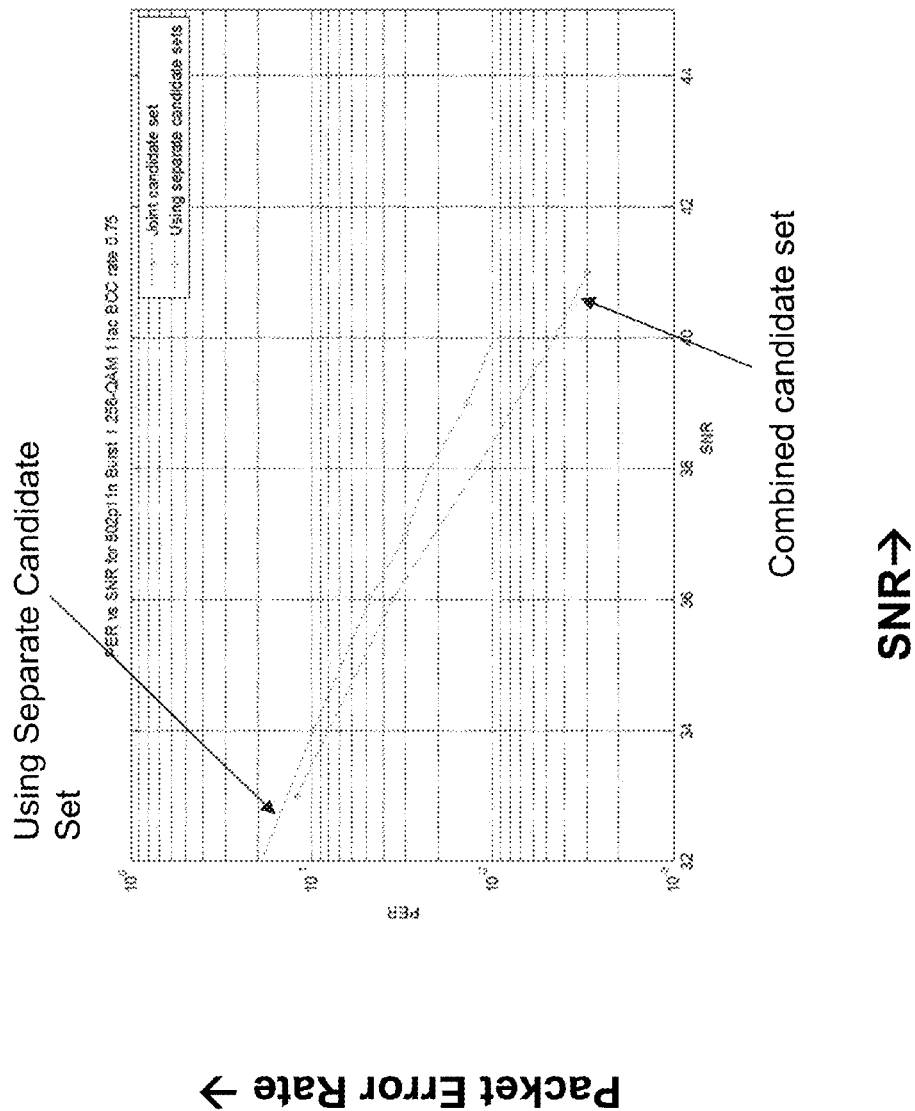
FIG. 4 shows simulation results of the respective performance of a MIMO detector with and without the use of an overall/combined candidate set, according to an embodiment of the invention.

In FIG. 4, the performance of the proposed detector with and without the use of joint candidate set is compared. It shows a gain of around 1.5 dB at PER of 1% by employing the joint candidate set for distance updating.

Figure 5:
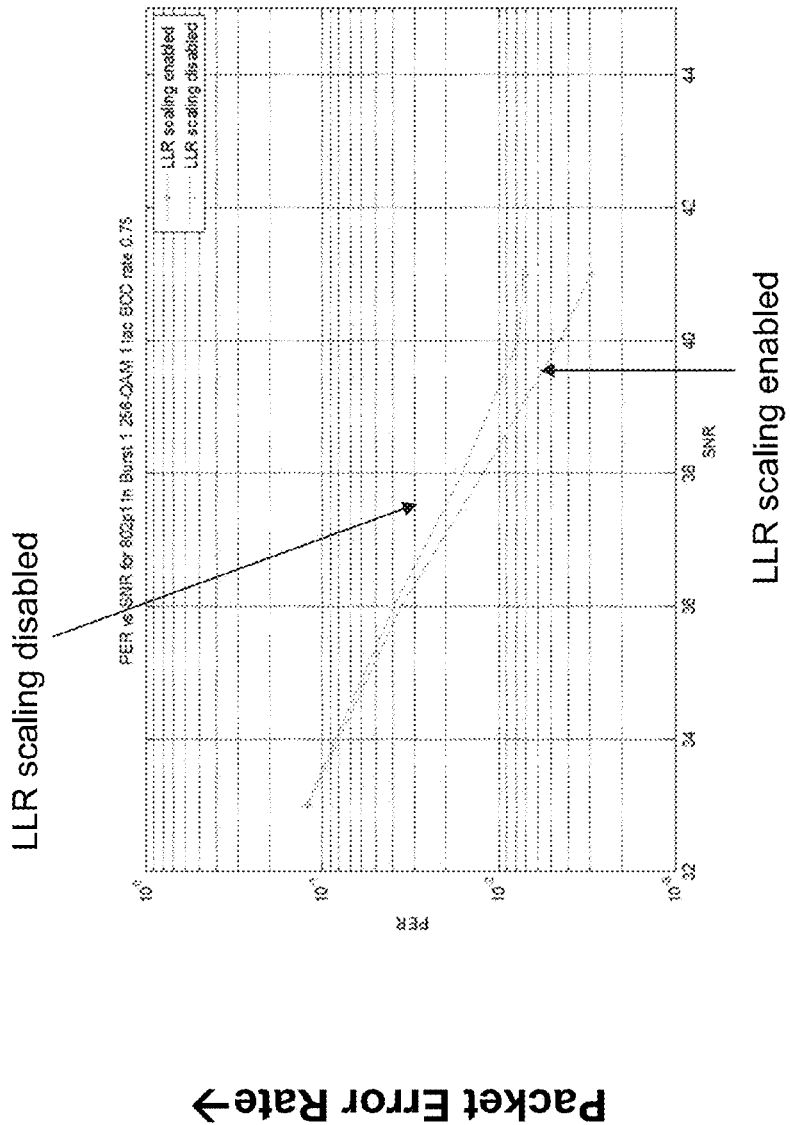
FIG. 5 illustrates the effectiveness of the LLR scaling, according to an embodiment of the invention.

FIG. 5 illustrate the effectiveness of the LLR scaling. A loss of 1 dB is observed if the LLR scaling functionality is disabled.

Figure 6:
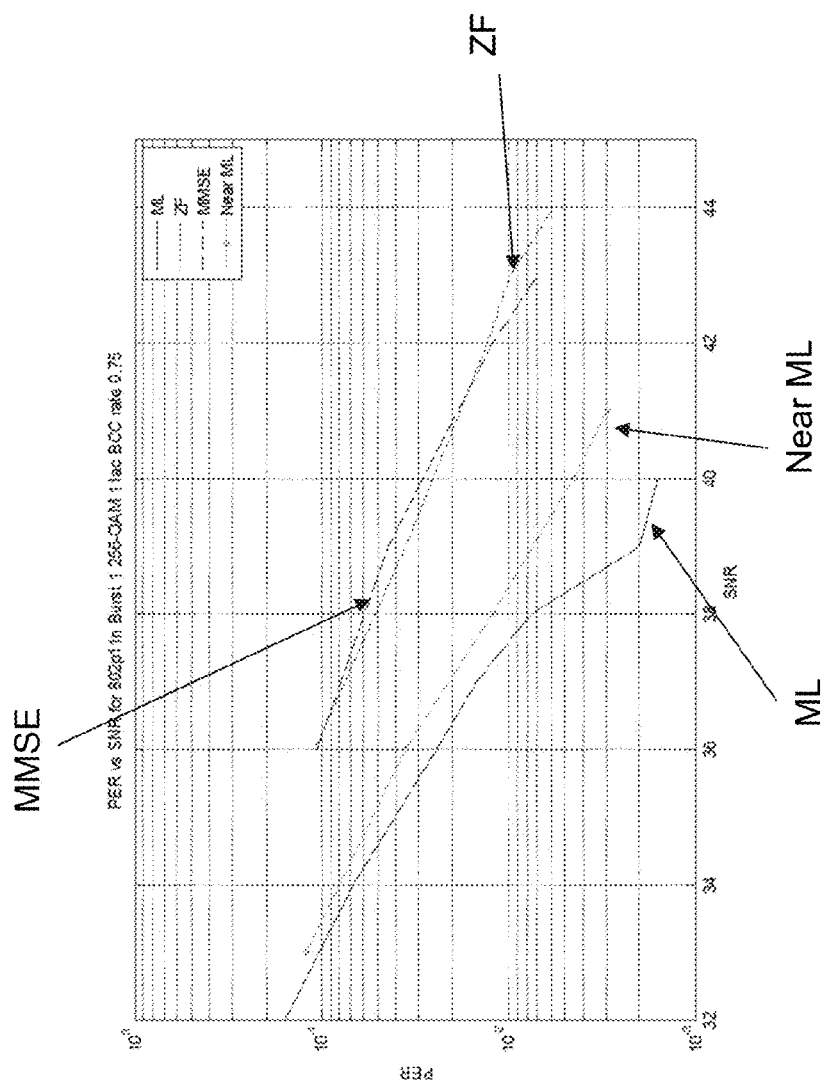
FIG. 6 compares the final performance of a MIMO detector according to an embodiment of the invention with that of a MMSE detector, a ZF detector and a ML detector.

FIG. 6 compares the final performance of the proposed detector, with that of a MMSE detector, a ZF detector and a ML detector. At 1% PER, its performance is about 4 dB better than the conventional MMSE/ZF-based methods, and is less than 0.5 dB worse than the optimal ML detector.

As the simulation results clearly demonstrate, the use of joint candidate set and the LLR scaling significantly improve the performance to approach that of the ML detection.

Although the invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method for detecting transmitted data over a communication channel in a broadband communication system with multiple transmit antennas and receive antennas, the method comprising:

receiving, at a receiver of the communication system, a received symbol vector corresponding to a transmitted symbol vector;

estimating the condition of the communication channel for each transmitted symbol in the transmitted symbol vector;

computing soft information of the transmitted symbol vector based on the received symbol vector; and conditionally scaling the computed soft information of the transmitted symbol vector according to the communication channel condition, wherein the computed soft information is scaled down if channel gain of the communication channel is below a predetermined threshold value.

2. The method of claim 1, wherein the scaling of the computed soft information consists of applying a scaling factor that is inversely reflective of the communication channel condition.

3. The method of claim 2, wherein the scaling factor is the inverse of the signal to noise ratio of the communication channel.

4. The method of claim 1, wherein the computing soft information of the transmitted symbol vector further comprises:

performing an initial symbol estimation for each transmitted symbol of the transmitted symbol vector based on the corresponding received symbol vector;

generating a candidate symbol set for each initially estimated symbol of the transmitted symbol vector; and computing soft information of each transmitted symbol in the transmitted symbol vector using the candidate symbol set corresponding to the transmitted symbol.

5. The method of claim 1, wherein the computing soft information of the transmitted symbol vector further comprises:

performing an initial symbol estimation for each symbol of the transmitted symbol vector based on the corresponding received symbol vector;

generating a candidate symbol set for each initially estimated symbol of the transmitted symbol vector, wherein the number of candidate symbols in each of the candidate symbol set is a predetermined number;

generating a combined set of candidate symbol vectors by using the candidate symbol sets corresponding to the initially estimated symbols; and computing soft information of the transmitted symbol vector using every candidate symbol vector of the combined set.

6. A MIMO detection apparatus for a wireless communication receiver, comprising:

an input port coupled to the multiple receive antennas of the receiver to receive a symbol vector corresponding to a transmitted symbol vector; and a processor configured to perform communication channel estimation for each transmitted symbol in the transmitted symbol vector, compute soft information of the transmitted symbol vector based on the received symbol vector and conditionally scale the computed soft information of the transmitted symbol vector according to the estimated communication channel condition, wherein the computed soft information is scaled down if channel gain of the communication channel is below a predetermined threshold value.

7. The apparatus of claim 6, wherein the conditional scaling of the computed soft information consists of applying a scaling factor that is inversely reflective of the communication channel condition.

8. The apparatus of claim 7, wherein the scaling factor is the inverse of the signal to noise ratio of the communication channel.

9. The apparatus of claim 6, wherein the processor is further configured to compute soft information of the transmitted symbol vector by:

performing an initial symbol estimation for each transmitted symbol of the transmitted symbol vector based on the corresponding received symbol vector;

generating a candidate symbol set for each initially estimated symbol of the transmitted symbol vector; and computing soft information of each transmitted symbol in the transmitted symbol vector using the candidate symbol set corresponding to the transmitted symbol.

10. The method of claim 1, wherein the soft information of the transmitted symbol vector consists of log-likelihood ratios (LLR) of the transmitted symbol vector.

11. The apparatus of claim 6, wherein the processor is further configured to compute the soft information of the transmitted symbol vector by:

performing an initial symbol estimation for each symbol of the transmitted symbol vector based on the corresponding received symbol vector;

generating a candidate symbol set for each initially estimated symbol of the transmitted symbol vector, wherein the number of candidate symbols in each of the candidate symbol set is a predetermined number;

generating a combined set of candidate symbol vectors by using the candidate symbol sets corresponding to the initially estimated symbols; and computing soft information of the transmitted symbol vector using every candidate symbol vector of the combined set.

12. The apparatus of claim 6, wherein the soft information of the transmitted symbol vector consists of log-likelihood ratios (LLR) of the transmitted symbol vector.

* * * * *